United States Patent
Fu (10) Patent No.: US 12,557,115 B2
(45) Date of Patent: Feb. 17, 2026

(54) METHOD AND APPARATUS FOR DETERMINING DATA PROCESSING DURATION, COMMUNICATION DEVICE AND STORAGE MEDIUM

(71) Applicant: Beijing Xiaomi Mobile Software Co., Ltd., Beijing (CN)

(72) Inventor: Ting Fu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 384 days.

(21) Appl. No.: 18/032,368

(22) PCT Filed: Oct. 19, 2020

(86) PCT No.: PCT/CN2020/121986
§ 371 (c)(1),
(2) Date: Apr. 18, 2023

(87) PCT Pub. No.: WO2022/082384
PCT Pub. Date: Apr. 28, 2022

(65) Prior Publication Data
US 2023/0397222 A1  Dec. 7, 2023

(51) Int. Cl.
*H04W 72/232* (2023.01)
*H04L 27/26* (2006.01)
(Continued)

(52) U.S. Cl.
CPC ..... *H04W 72/232* (2023.01); *H04L 27/26025* (2021.01); *H04W 72/1263* (2013.01); *H04W 72/51* (2023.01)

(58) Field of Classification Search
CPC ............... H04W 72/232; H04W 72/51; H04W 72/1263; H04L 27/26025
(Continued)

(56) References Cited

U.S. PATENT DOCUMENTS

| 2019/0289622 A1 | 9/2019 | Chatterjee et al. |
| 2020/0163031 A1 | 5/2020 | Loehr et al. |

(Continued)

FOREIGN PATENT DOCUMENTS

| CN | 101801095 A | 8/2010 |
| CN | 102595568 A | 7/2012 |

(Continued)

OTHER PUBLICATIONS

Huawei, HiSilicon, "Corrections on PDCCH/GC-PDCCH monitoring procedure in TS38.213", 3GPP TSG RAN WG1 Meeting #100-e, R1-2000195, (Feb. 24-Mar. 6, 2020).
(Continued)

Primary Examiner — Xuan Lu
(74) Attorney, Agent, or Firm — Volpe Koenig (57) ABSTRACT

A method, terminal and computer readable medium for improving wireless communication system. The wireless communication systems are improved by determining a data processing duration, includes: acquiring a time increment for performing preset data processing and is determined according to monitoring complexity of a physical downlink control channel (PDCCH), where the preset data processing is: demodulation of physical downlink shared channel (PDSCH) transmission or preparation for physical uplink shared channel (PUSCH) transmission, either of which is scheduled by downlink control information (DCI) monitored on the PDCCH.

20 Claims, 4 Drawing Sheets

(51) Int. Cl.
*H04W 72/1263* (2023.01)
*H04W 72/51* (2023.01)

(58) Field of Classification Search
USPC .......................................................... 370/329
See application file for complete search history.

(56) References Cited

U.S. PATENT DOCUMENTS

| | | | | |
|---|---|---|---|---|
| 2021/0143937 | A1* | 5/2021 | Ma | H04W 52/0229 |
| 2022/0046610 | A1* | 2/2022 | Cheng | H04L 5/0044 |
| 2022/0095371 | A1* | 3/2022 | Oh | H04L 1/1854 |

FOREIGN PATENT DOCUMENTS

| | | |
|---|---|---|
| CN | 109155727 A | 1/2019 |
| CN | 109565834 A | 4/2019 |
| CN | 109699076 A | 4/2019 |
| CN | 110012482 A | 7/2019 |
| CN | 110035545 A | 7/2019 |
| CN | 110719635 A | 1/2020 |
| CN | 110740512 A | 1/2020 |
| CN | 111148236 A | 5/2020 |
| CN | 111200870 A | 5/2020 |
| CN | 111277381 A | 6/2020 |
| CN | 111314260 A | 6/2020 |
| CN | 111432460 A | 7/2020 |
| WO | 2018058485 A1 | 4/2018 |
| WO | 2018106668 A2 | 6/2018 |
| WO | 2019137143 A1 | 7/2019 |
| WO | 2019237929 A1 | 12/2019 |

OTHER PUBLICATIONS

Ericsson "Potential UE complexity reduction features for RedCap" 3GPP TSG-RAN WG1 Meeting #102-e R1-2005234, Aug. 28, 2020 (Aug. 28, 2020) entire document; Type-A.

* cited by examiner

FIG. 1

Acquire a time increment for performing preset data processing and is determined according to PDCCH monitoring complexity — S101

METHOD AND APPARATUS FOR DETERMINING DATA PROCESSING DURATION, COMMUNICATION DEVICE AND STORAGE MEDIUM

CROSS REFERENCE TO RELATED APPLICATION

The present application is a U.S. National Stage of International Application No. PCT/CN2020/121986, filed on Oct. 19, 2020, the contents of all of which are incorporated herein by reference in their entirety for all purposes.

BACKGROUND

In 5G communication, a base station schedules uplink and downlink resources for terminal communication by sending downlink control information (DCI) carried by a physical downlink control channel (PDCCH) to a terminal. The terminal parses its own DCI by monitoring the PDCCH and transmits data on the corresponding scheduled uplink and downlink resources.

SUMMARY

The present disclosure provides a method and an apparatus for determining a data processing duration, a communication device, and a storage medium.

According to a first aspect of an embodiment of the present disclosure, there is provided a method for determining a data processing duration, performed by a base station and including:

acquiring a time increment for performing preset data processing and is determined according to physical downlink control channel (PDCCH) monitoring complexity, where the preset data processing is: demodulation of physical downlink shared channel (PDSCH) transmission or preparation for physical uplink shared channel (PUSCH) transmission, either of which is scheduled by downlink control information (DCI) monitored on the PDCCH.

According to a second aspect of an embodiment of the present disclosure, there is provided a method for determining a data processing duration, performed by a terminal and including:

determining a time increment for performing preset data processing according to physical downlink control channel (PDCCH) monitoring complexity, where the preset data processing is: demodulation of physical downlink shared channel (PDSCH) transmission or preparation for physical uplink shared channel (PUSCH) transmission, either of which is scheduled by downlink control information (DCI) monitored on the PDCCH.

According to a third aspect of an embodiment of the present disclosure, there is provided a communication device, at least including: a processor and a memory for storing executable instructions capable of running on the processor, where:

when the processor is used to run the executable instructions, the executable instructions execute the steps in the method for determining a processing time duration described in the first aspect above.

According to a fourth aspect of an embodiment of the present disclosure, there is provided a terminal, at least including: a processor and a memory for storing executable instructions capable of running on the processor, where:

when the processor is used to run the executable instructions, the executable instructions execute the steps in the method for determining a processing time duration described in the second aspect above.

According to a fifth aspect of an embodiments of the present disclosure, there is provided a non-transitory computer-readable storage medium, storing computer executable instructions, and when the computer executable instructions are executed by a processor, the steps in the method for determining a processing time duration described above are implemented.

BRIEF DESCRIPTION OF THE DRAWINGS

The accompanying drawings are incorporated into the specification and constitute a part of the specification, show embodiments consistent with the present invention, and are used to explain the principle of the embodiments of the present invention together with the specification.

DETAILED DESCRIPTION

Illustrative embodiments will be described in detail here, and examples of them are shown in the accompanying drawings. When the following descriptions refer to the figures, the same numbers in different figures indicate the same or similar elements, unless otherwise indicated. Implementations described in the following examples do not represent all implementations consistent with the embodiments of the present disclosure. Instead, they are merely examples of apparatuses and methods consistent with some aspects of the embodiments of the present disclosure described as detailed in the appended claims.

The terms used in the embodiments of the present disclosure are merely for the purpose of describing specific embodiments, and are not intended to limit the embodiments of the present disclosure. The terms "a/an" and "the" in the singular form used in the embodiments of the present disclosure and the appended claims are also intended to include the plural form, unless otherwise clearly indicated in the context. It should be further understood that the term "and/or" used here refers to and includes any or all possible combinations of one or more of the associated listed items.

It should be understood that although the terms "first," "second," "third," etc. may be used in the embodiments of the present disclosure to describe various information, the information should not be limited to these terms. These terms are merely used to distinguish the same type of information from one to another. For example, without departing from the scope of the embodiments of the present disclosure, the first information may also be referred to as second information, and similarly, the second information may also be referred to as first information. Depending on the context, the word "if" as used herein may be interpreted as "when," "upon," or "in response to determining."

The embodiments of the present disclosure relate to the field of radio communications but are not limited to the field of radio communications, and in particular to a method and an apparatus for determining a data processing duration, a communication device, and a storage medium.

When defining monitoring complexity of a physical downlink shared channel (PDSCH) based on a single slot, the 5G new radio (NR) protocol determines the time to demodulate the data transmitted by the PDSCH and the time to prepare the data transmitted by a physical uplink shared channel (PUSCH). However, for larger subcarrier spacing (SCS) in high-frequency communications, the duration of the single slot is too short. If a time unit containing a plurality of slots is used to define PDCCH monitoring complexity, it is difficult to ensure that the terminal can have sufficient duration to demodulate the required DCI.

To better describe any embodiment of the present disclosure, an embodiment of the present disclosure uses an application scenario of access control as an example to perform an example description.

Figure 1:
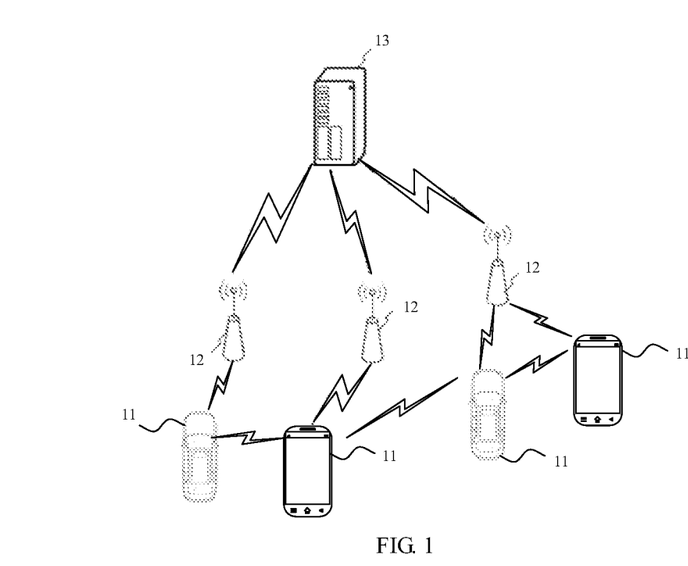
FIG. 1 is a schematic structural diagram of a radio communication system according to an example.

Referring to FIG. 1, shows a schematic structural diagram of a radio communication system according to an embodiment of the present disclosure. As shown in FIG. 1, the radio communication system is a communication system based on a cellular mobile communication technology and may include: a plurality of terminals 11 and a plurality of base stations 12.

Where the terminal 11 may refer to a device for providing voice and/or data connectivity for a user. The terminal 11 may be in communication with one or more core networks via a radio access network (RAN), and the terminal 11 may be an Internet of Things terminal, such as a sensor device, a mobile phone (or "cellular" phone), and a computer having the Internet of Things terminal, for example, may be a fixed, portable, pocket, handheld, computer built-in, or vehicle-mounted apparatus. For example, a station (STA), a subscriber unit, a subscriber station, a mobile station, a mobile, a remote station, an access point, a remote terminal, an access terminal, a user terminal, a user agent, a user device, or user equipment. Or the terminal 11 may also be an unmanned aerial vehicle device. Or the terminal 11 may also be a vehicle-mounted device. For example, may be a trip computer having a radio communication function, or may be a radio terminal connected to the trip computer externally. Or the terminal 11 may also be a roadside device. For example, may be a street lamp, a signal light, or other roadside devices having the radio communication function.

The base station 12 may be a network side device in the radio communication system. Where the radio communication system may be the 4th generation mobile communication technology (4G) system, also referred to as a long term evolution (LTE) system; or, the radio communication system may also be a 5G system, also referred to as a new radio (NR) system or a 5G NR system. Or the radio communication system may also be a next generation system of the system. Where an access network in the 5G system may be referred to as a new generation-radio access network (NG-RAN).

Where the base station 12 may be an evolved base station (eNB) used in the 4G system. Or the base station 12 may also be a base station using a centralized distribution architecture (gNB) in the 5G system. When the base station 12 uses the concentrated distribution architecture, a central unit (CU) and at least two distributed units (DU) are included usually. The central unit is provided with protocol stacks of a packet data convergence protocol (PDCP) stratum, a radio link control (RLC) protocol stratum, and a media access control (MAC) stratum; and each distributed unit is provided with a protocol stack of a physical (PHY) stratum, and the embodiments of the present disclosure do not limit the specific implementations of the base station 12.

Radio connection between the base station 12 and the terminal 11 may be established by means of a wireless air interface. In different implementations, the wireless air interface is a wireless air interface based on the fourth generation mobile communication network technology (4G) standard, or the wireless air interface is a wireless air interface based on the fifth generation mobile communication network technology (5G) standard, for example, the wireless air interface is a new radio; or the wireless air interface may also be a wireless air interface based on a further next generation mobile communication network technology standard of 5G.

In some embodiments, end to end (E2E) connection may further be established between the terminals 11. For example, scenarios such as vehicle to vehicle (V2V) communication, vehicle to infrastructure (V2I) communication, and vehicle to pedestrian (V2P) communication in vehicle to everything (V2X) communication.

In some embodiments, the radio communication system may further include a network management device 13.

A plurality of base stations 12 are connected with the network management device 13 respectively. Where the network management device 13 may be a core network device of the radio communication system, for example, the network management device 13 may be a mobility management entity (MME) in an evolved data packet core network (EPC). Or the network management device may also be other core network devices, such as a serving gateway (SGW), a public data network gateway (PGW), a policy and charging rules function (PCRF) unit, or a home subscriber server (HSS). The embodiments of the present disclosure do not limit an implementation form of the network management device 13.

Figure 2:
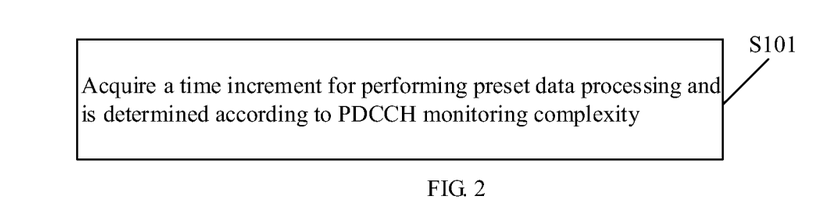
FIG. 2 is a schematic flowchart I of a method for determining preset data processing according to an example.

As shown in FIG. 2, an embodiment of the present disclosure provides a method for determining a data processing duration, performed by a terminal and including:

Step S101: acquiring a time increment for performing preset data processing and is determined according to PDCCH monitoring complexity, where the preset data processing is: demodulation of PDSCH transmission or preparation for PUSCH transmission, either of which is scheduled by DCI monitored on the PDCCH.

During communication between UE and the base station, the base station sends downlink control information through a PDCCH to provide various control information, including hybrid automatic repeat request (HARD), power control commands, identification data transmission formats, and power control to a terminal. The base station sends various control information to a plurality of users simultaneously while sending DCI. Therefore, the UE needs to identify the DCI it needs through blind detection.

The PDCCH monitoring complexity refers to the ability of the UE's own system to perform blind detection of PDCCH monitoring events, including the maximum number of blind detection times on a single slot, and the maximum number of non-overlapping CCEs (Control Channel Elements). Based on the PDCCH monitoring complexity, the duration for the UE to demodulate the DCI can be determined, and then the duration for performing the preset data processing: demodulation of the PDSCH transmission and the preparation for the PUSCH transmission is determined.

In an embodiment of the present disclosure, downlink data is carried on a PDSCH and uplink data is carried on a PUSCH. A base station schedules transmission at the PDSCH and/or the PUSCH through DCI. The DCI is carried and transmitted on the PDCCH, and resources on the PDCCH are also referred to as a control resource set (CORESET).

An embodiment of the present disclosure determines the duration increment for demodulation of PDSCH transmission or preparation for PUSCH transmission based on PDCCH monitoring complexity, and providing a corresponding duration increment relative to the duration determined for the processing defined under a single slot. In this way, it is convenient for a terminal to demodulate DCI received in a short period of time in the processing duration including the duration increment, and complete the demodulation of the PDSCH transmission or the preparation for the PUSCH transmission.

In the 5G NR protocol, N1 value is the minimum PDSCH demodulation time (the shortest interval from the PDSCH end position to the start position of an HARQ response message) and N2 value is the PUSCH preparation duration (from the end position of the PDCCH where the scheduling DCI is located to the start position of the PUSCH) are defined under different SCS (15/30/60/120 KHz).

For example, under the condition of UE capabilities and network configuration, N1 value is shown in Table 1 below (subcarriers 0/1/2/3 represent 15/30/60/120 kHz respectively):

TABLE 1

| Subcarrier | $N_1$ symbol number |
|---|---|
| 0 | 8 |
| 1 | 10 |
| 2 | 17 |
| 3 | 20 |

For example, under the condition of UE capabilities and network configuration, N2 value is shown in Table 2 below:

TABLE 2

| Subcarrier | $N_2$ symbol number |
|---|---|
| 0 | 10 |
| 1 | 12 |
| 2 | 23 |
| 3 | 36 |

However, under larger SCS (240/480/960 KHz, etc.), PDSCH demodulation duration and PUSCH preparation duration have not yet been determined.

In the 5G NR protocol, the blind detection capability of UE on a single carrier is specified. According to different SCS, the blind detection capability of the UE within a slot is specified, mainly including the maximum number of blind detection times within each slot, as shown in Table 3, and the maximum number of non-overlapping CCEs within each slot, as shown in Table 4. (In the table, μ=0 represents SCS being 15 KHz, μ=1 represents SCS being 30 KHz, μ=2 represents SCS being 60 KHz, and so on)

TABLE 3

| μ | The maximum number of blind detection times per slot in a single serving cell $M_{PDCCH}^{max,\ slot,\ \mu}$ |
|---|---|
| 0 | 44 |
| 1 | 36 |
| 2 | 22 |
| 3 | 20 |

TABLE 4

| μ | The maximum number of non-overlapping CCEs per slot in a single serving cell $C_{PDCCH}^{max,\ slot,\ \mu}$ |
|---|---|
| 0 | 56 |
| 1 | 56 |
| 2 | 48 |
| 3 | 32 |

Currently, the NR protocol is only used in frequencies below 52.6 GHz, and the optional SCS is 15 KHz/30 KHz/60 KHz/120 KHz. The duration of a slot is 1 ms for a 15 KHz subcarrier bandwidth, the duration of a slot is 0.5 ms for a 30 KHz subcarrier bandwidth, the duration of a slot is 0.25 ms for a 60 KHz subcarrier bandwidth, and so on. It may be seen that the larger the SCS, the shorter the duration of a slot. Therefore, PDCCH monitoring complexity may be defined by a plurality of slots.

However, under the condition that a time unit defining the PDCCH monitoring complexity is a plurality of slots, it might occur that a large number of DCI aggregates in a certain slot for centralized transmission within a PDCCH monitoring period. The aggregating transmission mode might have an impact on the duration of DCI demodulation by a terminal. Considering the centralized transmission of DCI on two or three symbols in one slot, and with the same average DCI detection complexity in the same unit time, the larger the time unit, the longer the terminal needs to ensure that all DCI can be demodulated.

Therefore, in an embodiment of the present disclosure, a time increment of duration for demodulation of PDSCH transmission or preparation for PUSCH transmission may be determined according to the PDCCH monitoring complexity, so as to provide sufficient duration relative to the duration defined under a single slot, and further meet the capabilities of the terminal to demodulate all DCI.

In some embodiments, the acquiring a time increment for performing preset data processing and is determined according to PDCCH monitoring complexity includes:

determining a time increment for performing preset data processing according to PDCCH monitoring complexity;

or receiving a time increment for performing preset data processing, determined according to PDCCH monitoring complexity and reported by user equipment (UE).

In an embodiment of the present disclosure, a base station obtains the time increment from a terminal, and may also determine the time increment by itself. In other words, the method for determining a data processing duration may be executed by a base station or UE conducting radio communication. For example, the base station determines the time increment by acquiring PDCCH monitoring complexity of the UE or by determining the PDCCH monitoring complexity through a protocol. Further, the duration for performing the preset data processing may be determined through the time increment and known reference duration, and data scheduling may be performed based on the duration.

Figure 3:
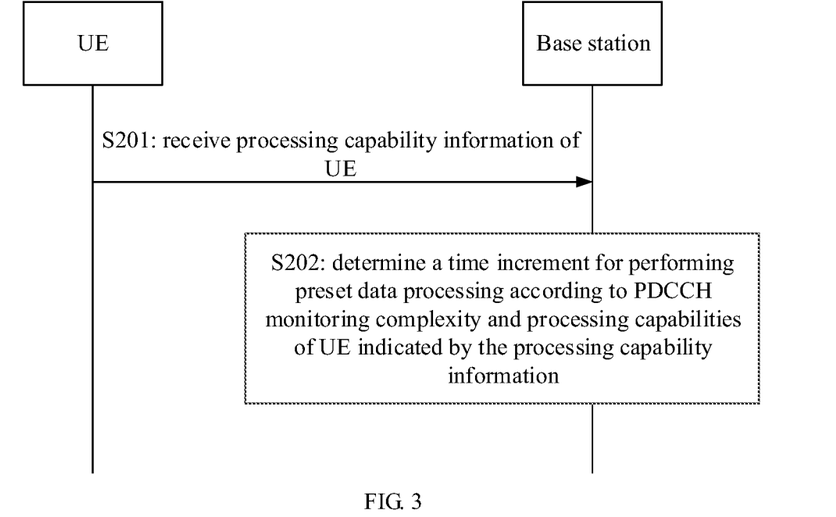
FIG. 3 is a schematic flowchart II of a method for determining preset data processing according to an example.

In some embodiments, as shown in FIG. 3, the method further includes:

Step S201: receiving processing capability information of UE;

the determining a time increment for performing preset data processing according to PDCCH monitoring complexity includes:

Step S202: determining a time increment for performing preset data processing according to PDCCH monitoring complexity and processing capabilities, indicated by the processing capability information, of the UE.

In an embodiment of the present disclosure, a base station may acquire PDCCH monitoring complexity supported by a terminal as well as processing capabilities of UE through the protocol, and may also directly receive the PDCCH monitoring complexity supported by the UE as well as the processing capabilities of the UE through reporting processing capabilities of the UE. The processing capabilities of the UE include the processing speed of the UE for DCI demodulation, the capability of decoding downlink data, the capability of encoding uplink data, etc.

The processing capabilities of different UE vary, so the duration for DCI demodulation and demodulation response PDSCH transmissions, as well as preparation for PUSCH transmissions varies. Therefore, in an embodiment of the present disclosure, the time increment is determined by the PDCCH monitoring complexity and the processing capabilities of the UE.

In this way, it is convenient for the terminal to complete the DCI demodulation and the preset data processing within a sufficiently long period of time.

In some embodiments, PDCCH monitoring complexity is associated with a time unit that defines the PDCCH monitoring complexity;

the determining a time increment for performing preset data processing according to PDCCH monitoring complexity includes:

determining a time increment for performing preset data processing according to the time unit that defines the PDCCH monitoring complexity.

In an embodiment of the present disclosure, considering that in scenarios such as high-frequency communication, the time of a single slot is relatively short, and not every slot can be used to transmit DCI. Therefore, corresponding PDCCH monitoring complexity may be defined within a time unit of a plurality of slots.

Here, the PDCCH monitoring complexity is represented by a time unit, and the PDCCH monitoring complexity supported by a terminal is: the maximum number of blind detection times, the maximum number of non-overlapping CCEs and the like in the time unit. For example, if the time unit has 4 slots, the PDCCH monitoring complexity is the maximum number of blind detection times and the maximum number of non-overlapping CCEs supported by the terminal per 4 slots. At this time, the maximum number of blind detection times and the maximum number of non-overlapping CCEs per slot are ¼ of the monitoring complexity. However, in fact, it is possible that DCI is received in each of the four slots, or it might only be received in a centralized manner in part of the slots, that is, the terminal only performs parse after receiving DCI, therefore, the time unit containing multiple slots is used to define the PDCCH monitoring complexity.

For example, around a high frequency band of 60 GHz, a larger subcarrier bandwidth, such as 960 KHz, may be selected to cope with phase noise. Larger SCS corresponds to smaller slot duration. In a case of 960 KHz, the duration of one slot is 0.015625 ms, i.e., 1/64 ms. Due to the short duration of a slot in a high-frequency communication system, there might be two ways to define PDCCH monitoring complexity:

Way 1: still define the PDCCH monitoring complexity by using each slot as a time unit; and Way 2: define the maximum PDCCH monitoring complexity of the terminal based on a time unit with a plurality of slots as the unit. For example, when SCS is equal to 480 KHz, the PDCCH monitoring complexity supported by the terminal is defined as:

the maximum number of blind detection times supported per 4 slots is 30; and the maximum number of non-overlapping CCEs supported per 4 slots is 40.

The advantage of using a plurality of slots as a time unit is that the terminal does not need to unnecessarily spread the blind detection capability across each slot. At the same time, a base station may also configure a longer PDCCH monitoring period, which allows the terminal to not monitor PDCCH in most slots and only need to receive PDCCH in a centralized manner on certain slots, which is conducive to energy conservation of the terminal.

In an embodiment of the present disclosure, based on the duration used for the preset data processing and corresponding to the maximum number of blind detection times and the maximum number of non-overlapping CCEs of the PDCCH monitoring complexity averagely per time slot, the time increment for the UE to perform the preset processing when all DCI is transmitted in a centralized manner within the time unit is also considered, further enabling the demodulation duration of PDSCH transmission and the preparation for PUSCH transmission to be determined to meet the UE demodulation capability.

In some embodiments, the method further includes:

determining a time unit that defines PDCCH monitoring complexity according to SCS applied by UE.

In an embodiment of the present disclosure, the monitoring complexity of the PDCCHs of terminals corresponding to different SCS on a single slot is different. Therefore, in high-frequency communication, the time units that define PDCCH monitoring complexity under different SCS are also different. For example, when the SCS frequency is low, the PDCCH monitoring complexity is defined all in single slot, while when the SCS is located in different frequency bands, the time units used to define the PDCCH monitoring complexity are determined corresponding to a different number of slots respectively.

In this way, the time unit defining the PDCCH monitoring complexity is more flexible, which is convenient for meeting the communication requirements of UE under different SCS.

In some embodiments, the time increment is the duration increment for performing preset data processing and is relative to a time unit that defines PDCCH monitoring complexity is one slot.

In an embodiment of the present disclosure, considering that the terminal itself performs DCI demodulation and PDSCH transmission demodulation or preparation for PUSCH transmission is usually performed in a slot as the unit. On this basis, if the PDCCH monitoring complexity is defined by a time unit containing a plurality of slots, a plurality of DCI might be centralized in the same slot for transmission, resulting in longer duration of demodulation for the terminal.

Therefore, in the embodiment of the present disclosure, the duration increment is defined based on the duration for performing preset data processing when the time unit defining the PDCCH monitoring complexity is 1 slot. In this way, the actual duration for performing preset data processing is the processing duration corresponding to the originally defined time unit of 1 slot plus the duration increment. For example, if the time unit defining the PDCCH monitoring complexity is 1 slot, the duration for performing preset data processing is N transmission symbols, and the duration increment is O transmission symbols, then the duration for performing the preset data processing when the PDCCH monitoring complexity is defined on the time unit containing a plurality of slots may be determined as N+O.

In this way, by determining the duration increment, it is convenient to define the PDCCH monitoring complexity compatible with the single slot corresponding to the existing protocol, so that UE has sufficient duration to complete the preset data processing.

Figure 4:
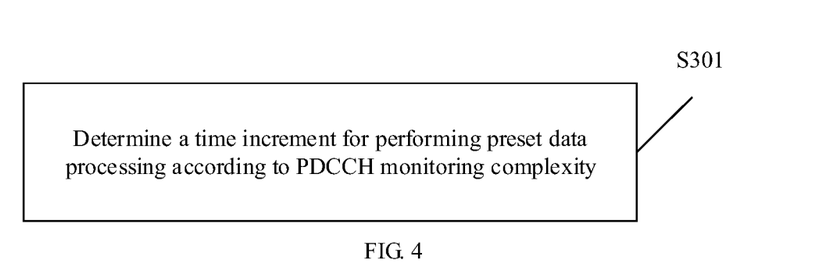
FIG. 4 is a schematic flowchart III of a method for determining preset data processing according to an example.

As shown in FIG. 4, an embodiment of the present disclosure provides a method for determining a data processing duration, performed by a terminal and including:

Step S301: determining a time increment for performing preset data processing according to physical downlink control channel (PDCCH) monitoring complexity, where the preset data processing is: demodulation of physical downlink shared channel (PDSCH) transmission or preparation for physical uplink shared channel (PUSCH) transmission, either of which is scheduled by downlink control information (DCI) monitored on the PDCCH.

In this embodiment, the main body executing the method for determining the time increment described above is the terminal, which reports the determined time increment to a base station that communicates with the terminal.

Here, the terminal may be any UE with radio communication functions, such as mobile phones, laptops, wireless wearable devices, and various other communication devices. In an embodiment of the present disclosure, the terminal may determine the time increment by the PDCCH monitoring complexity support by itself and communication capabilities.

In some embodiments, the method further includes:
reporting a time increment to a base station.
In another embodiment, a base station may also determine the time increment directly through a protocol.

In some embodiments, a method for determining a data processing duration, provided by an embodiment of the present disclosure, includes:
reporting processing capability information of the terminal to a base station.
The processing capabilities of the terminal include the processing speed of the terminal for DCI demodulation, the capability of decoding downlink data, the capability of encoding uplink data, etc.

In some embodiments, a method for determining a data processing duration, provided by an embodiment of the present disclosure, is performed by UE and includes:
reporting processing capability information of UE, where the processing capability information is used by a base station to determine a time increment for performing preset data processing in combination with PDCCH monitoring complexity, where the preset data processing is: demodulation of physical downlink shared channel (PDSCH) transmission or preparation for physical uplink shared channel (PUSCH) transmission, either of which is scheduled by downlink control information (DCI) monitored on the PDCCH.

The processing capabilities of different terminals vary, so the duration for DCI demodulation and demodulation response PDSCH transmissions, as well as preparation for PUSCH transmissions varies. Therefore, in the embodiment of the present disclosure, the terminal reports its own processing capabilities to the base station, and the base station determines the time increment through the PDCCH monitoring complexity and the processing capabilities of the terminal.

In some embodiments, PDCCH monitoring complexity is associated with a time unit that defines the PDCCH monitoring complexity;
the determining a time increment for performing preset data processing according to PDCCH monitoring complexity includes:
determining a time increment for performing preset data processing according to the time unit that defines the PDCCH monitoring complexity.

In an embodiment of the present disclosure, considering that in scenarios such as high-frequency communication, the time of a single slot is relatively short, and not every slot can be used to transmit DCI. Therefore, corresponding PDCCH monitoring complexity may be defined within a time unit of a plurality of slots.

Here, the PDCCH monitoring complexity is represented by a time unit, and the PDCCH monitoring complexity supported by a terminal is: the maximum number of blind detection times, the maximum number of non-overlapping CCEs and the like in the time unit. For example, if the time unit has 4 slots, the PDCCH monitoring complexity is the maximum number of blind detection times and the maximum number of non-overlapping CCEs supported by the terminal per 4 slots. At this time, the maximum number of blind detection times and the maximum number of non-overlapping CCEs per slot are ¼ of the monitoring complexity. However, in fact, it is possible that DCI is received in each of the four slots, or it might only be received in a centralized manner in part of the slots. For example, the terminal only performs parse after receiving DCI. Therefore, the time unit containing multiple slots is used to define the PDCCH monitoring complexity.

In some embodiments, the method further includes:
determining a time unit that defines PDCCH monitoring complexity according to SCS applied by the terminal.
In an embodiment of the present disclosure, the monitoring complexity of the PDCCHs of terminals corresponding to different SCS on a single slot is different. Therefore, in high-frequency communication, the time units that define PDCCH monitoring complexity under different SCS are also different. For example, when the SCS frequency is low, the PDCCH monitoring complexity is defined all in single slot, while when the SCS is located in different frequency bands, the time units used to define the PDCCH monitoring complexity are determined corresponding to a different number of slots respectively.

In this way, the time unit defining the PDCCH monitoring complexity is more flexible, which is convenient for meeting the communication requirements of UE under different SCS.

In some embodiments, the time increment is the duration increment for performing preset data processing and is relative to a time unit that defines PDCCH monitoring complexity is one slot.

In an embodiment of the present disclosure, considering that the terminal itself performs DCI demodulation and PDSCH transmission demodulation or preparation for PUSCH transmission is usually performed in a slot as the unit. On this basis, if the PDCCH monitoring complexity is defined by a time unit containing a plurality of slots, a plurality of DCI might be centralized in the same slot for transmission, resulting in longer duration of demodulation for the terminal.

Therefore, in the embodiment of the present disclosure, the duration increment is defined based on the duration for performing preset data processing when the time unit defining the PDCCH monitoring complexity is 1 slot. In this way, the actual duration for performing preset data processing is the processing duration corresponding to the originally defined time unit of 1 slot plus the duration increment. For example, if the time unit defining the PDCCH monitoring complexity is 1 slot, the duration for performing preset data processing is N transmission symbols, and the duration increment is 0 transmission symbols, then the duration for performing the preset data processing when the PDCCH monitoring complexity is defined on the time unit containing a plurality of slots may be determined as N+O.

In this way, by determining the duration increment, it is convenient to define the PDCCH monitoring complexity compatible with the single slot corresponding to the existing protocol, so that UE has sufficient duration to complete the preset data processing.

An embodiment of the present disclosure provides a method for determining a data processing duration, including:
  determining a time increment for performing preset data processing according to PDCCH monitoring complexity, where the preset data processing is: demodulation of PDSCH transmission or preparation for PUSCH transmission, either of which is scheduled by DCI monitored on the PDCCH.

Here, the method for determining a data processing duration may be executed by a base station or UE conducting radio communication. For example, the base station determines the time increment by acquiring PDCCH monitoring complexity of the UE or by determining the PDCCH monitoring complexity through a protocol. Further, the duration for performing the preset data processing may be determined through the time increment and known reference duration, and data scheduling may be performed based on the duration.

In some embodiments, the PDCCH monitoring complexity is associated with a time unit that defines the PDCCH monitoring complexity;
  the determining a time increment for performing preset data processing according to the PDCCH monitoring complexity includes:
  determining a time increment for performing preset data processing according to the time unit that defines the PDCCH monitoring complexity.

In some embodiments, the method further includes:
  determining a time unit that defines PDCCH monitoring complexity according to SCS applied by UE.

In some embodiments, the determining a time increment for performing preset data processing according to PDCCH monitoring complexity includes:
  determining a time increment for performing preset data processing according to PDCCH monitoring complexity and processing capabilities of UE;

In some embodiments, the method is performed by a terminal, and further includes:
  reporting determined time increment.

In some embodiments, the time increment is the duration increment for performing preset data processing and is relative to a time unit that defines PDCCH monitoring complexity is one slot.

An embodiment of the present disclosure further provides the following examples:

In the protocol, an optional time unit defining PDCCH monitoring complexity under different SCS is defined directly, and the time increments for PDSCH demodulation and PUSCH processing under the time unit are defined. The time increment is an increment of PDSCH demodulation duration or PUSCH processing duration relative to a single slot as a time unit for defining PDCCH monitoring complexity.

For example, it is defined in the protocol that under 480 kHz SCS, the optional time unit for PDCCH monitoring complexity contains 4 slots, and the time increment for PDSCH demodulation under the time unit is symbol O1; and the time increment for PUSCH processing is symbol O2. In addition, the protocol defines the PDSCH demodulation duration as symbol N1 when the PDCCH monitoring complexity is defined in a single slot as a time unit; PUSCH processing duration is defined as symbol N2. Then, under 480 kHz SCS, when the time unit of PDCCH monitoring complexity contains 4 slots, the PDSCH demodulation duration is determined by N1 and O1, such as the sum of N1 and O1; and the PUSCH processing duration is determined by symbols N2 and O2, such as the sum of N2 and O2.

In addition, the terminal may report its own blind detection capability in a certain time unit as the unit to the base station, as well as the corresponding incremental duration. The time increment is an increment of PDSCH demodulation duration or PUSCH processing duration relative to a single slot as a time unit for defining PDCCH monitoring complexity defined in the protocol.

For example, the terminal reports to the base station that under 480 kHz SCS, the time unit for defining PDCCH monitoring complexity of the terminal contains 4 slots, and reports that the time increment for PDSCH demodulation under the time unit is symbol O1; and the time increment for PUSCH processing is symbol O2. In addition, the PDSCH demodulation duration is defined as symbol N1 when the PDCCH monitoring complexity is defined in a single slot as a time unit; PUSCH processing duration is defined as symbol N2. Then, under 480 kHz SCS, when the time unit of PDCCH monitoring complexity contains 4 slots, the PDSCH demodulation duration is determined by symbols N1 and O1, such as the sum of N1 and O1; and the PUSCH processing duration is determined by symbols N2 and O2, such as the sum of N2 and O2.

Figure 5:
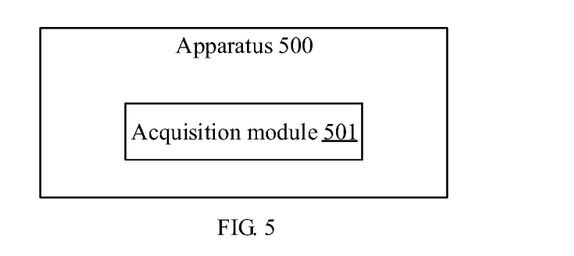
FIG. 5 is a structural block diagram I of an apparatus for determining preset data processing according to an example.

As shown in FIG. 5, an embodiment of the present disclosure further provides an apparatus 500 for determining a data processing duration, performed by a base station and including:
  an acquisition module 501, configured to acquire a time increment for performing preset data processing and is determined according to physical downlink control channel (PDCCH) monitoring complexity, where the preset data processing is: demodulation of physical downlink shared channel (PDSCH) transmission or preparation for physical uplink shared channel (PUSCH) transmission, either of which is scheduled by downlink control information (DCI) monitored on the PDCCH.

In some embodiments, the acquisition module 501 includes:
  a first determination module, configured to determine a time increment for performing preset data processing according to PDCCH monitoring complexity; or
  a first receiving module, configured to receive a time increment for performing preset data processing, determined according to PDCCH monitoring complexity and reported by a user equipment (UE).

In some embodiments, the apparatus further includes:
a second receiving module, configured to receive processing capability information of UE;
the first determination module is further configured to:
determine a time increment for performing preset data processing according to PDCCH monitoring complexity and processing capabilities, indicated by the processing capability information, of the UE.

In some embodiments, PDCCH monitoring complexity is associated with a time unit that defines the PDCCH monitoring complexity;
the first determination module is further configured to:
determine a time increment for performing preset data processing according to the time unit that defines the PDCCH monitoring complexity.

In some embodiments, the apparatus further includes:
a second determination module, configured to determine a time unit that defines PDCCH monitoring complexity according to subcarrier spacing (SCS) applied by UE.

In some embodiments, the time increment is the duration increment for performing preset data processing and is relative to a time unit that defines PDCCH monitoring complexity is one slot.

Figure 6:
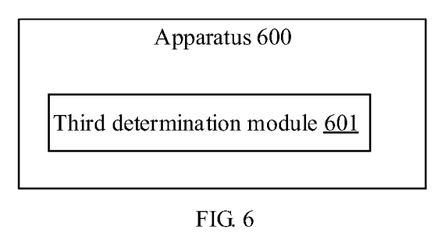
FIG. 6 is a structural block diagram II of an apparatus for determining preset data processing according to an example.

As shown in FIG. 6, an embodiment of the present disclosure provides an apparatus 600 for determining a data processing duration, performed by a terminal and including:
a third determination module 601, configured to determine a time increment for performing preset data processing according to physical downlink control channel (PDCCH) monitoring complexity, where the preset data processing is: demodulation of physical downlink shared channel (PDSCH) transmission or preparation for physical uplink shared channel (PUSCH) transmission, either of which is scheduled by downlink control information (DCI) monitored on the PDCCH.

In some embodiments, the apparatus further includes:
a first reporting module, configured to report processing capability information of a terminal to a base station.

In some embodiments, PDCCH monitoring complexity is associated with a time unit that defines the PDCCH monitoring complexity;
the third determination module 601 includes:
a first determination submodule, configured to determine a time increment for performing preset data processing according to the time unit that defines PDCCH monitoring complexity.

In some embodiments, the apparatus further includes:
a fourth determination module, configured to determine a time unit that defines PDCCH monitoring complexity according to SCS applied by a terminal.

In some embodiments, the time increment is the duration increment for performing preset data processing and is relative to a time unit that defines PDCCH monitoring complexity is one slot.

In some embodiments, the apparatus further includes:
a second reporting module, configured to report a time increment to a base station.

With regard to the apparatus in the above embodiments, the specific manners in which various modules perform operations have been described in detail in the embodiments relating to the method, and details are not described herein.

Figure 7:
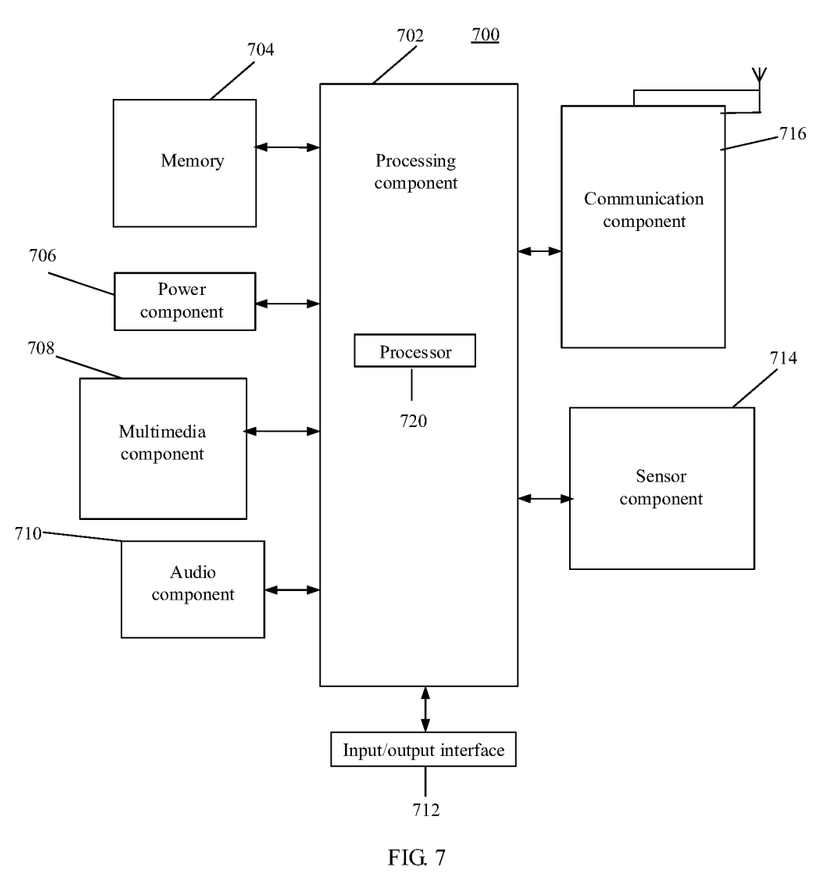
FIG. 7 is a schematic structural diagram of a terminal according to an example.

FIG. 7 is a structural block diagram of a terminal 700 according to an embodiment of the present disclosure. The terminal 700 may be a mobile phone, a computer, a digital broadcasting user equipment, a messaging device, a game console, a tablet device, a medical device, a fitness device, a personal digital assistant, etc.

Referring to FIG. 7, the terminal 700 may include at least one of the following components: a processing component 702, a memory 704, a power component 706, a multimedia component 708, an audio component 710, an input/output (I/O) interface 712, a sensor component 714, and a communication component 716.

The processing component 702 generally controls the overall operations of the terminal 700, such as operations associated with display, telephone calls, data communications, camera operations and recording operations. The processing component 702 may include at least one processor 720 to execute instructions to complete all or part of the steps of the above method. In addition, the processing component 702 may include at least one module to facilitate interaction between the processing component 702 and other components. For example, the processing component 702 may include a multimedia module to facilitate interaction between the multimedia component 708 and the processing component 702.

The memory 704 is configured to store various types of data to support the operations at the terminal 700. Examples of these data include instructions for any application or method operated on the terminal 700, contact data, phone book data, messages, pictures, videos, etc. The memory 704 may be realized by any type of volatile or non-volatile storage equipment or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 706 provides power to various components of the terminal 700. The power component 706 may include a power management system, at least one power source, and other components associated with power generation, management and distribution of the terminal 700.

The multimedia component 708 includes a screen for providing an output interface between the terminal 700 and the user. In some embodiments, the screen may include a liquid crystal display (LCD) and a touch panel (TP). If the screen includes a touch panel, the screen may be implemented as a touch screen to receive input signals from the user. The touch panel includes at least one touch sensor to sense touches, slides and gestures on the touch panel. The touch sensor may sense not only the boundary of the touch or slide, but also the wake-up time and pressure associated with the touch or slide. In some embodiments, the multimedia component 708 includes a front camera and/or a rear camera. When the terminal 700 is in an operation mode, such as a shooting mode or a video mode, the front camera and/or the rear camera may receive external multimedia data. Each front or rear camera may be a fixed optical lens system or have a focal length and optical zoom capability.

The audio component 710 is configured to output and/or input audio signals. For example, the audio component 710 includes a microphone (MIC), which is configured to receive external audio signals when the terminal 700 is in an operation mode, such as a call mode, a recording mode and a voice recognition mode. The received audio signals may be further stored in the memory 704 or sent by the communication component 716. In some embodiments, the audio component 710 further includes a speaker for outputting audio signals.

The I/O interface 712 provides an interface between the processing component 702 and a peripheral interface module, and the peripheral interface module may be a keyboard, a click wheel, buttons, etc. These buttons may include, but are not limited to a home button, a volume button, a start button, and a lock button.

The sensor component 714 includes at least one sensor for providing various aspects of status assessment for the terminal 700. For example, the sensor component 714 may detect the on/off states of the terminal 700, and a relative positioning of components, for example, the components are the display and keypad of the terminal 700. The sensor component 714 may further detect a change of position of the terminal 700 or one component of the terminal 700, whether or not the user touches the terminal 700, a location or acceleration/deceleration of the terminal 700, and a temperature variation of the terminal 700. The sensor component 714 may include a proximity sensor configured to detect the presence of nearby objects without any physical contact. The sensor component 714 may further include an optical sensor, such as a CMOS or CCD image sensor, for use in imaging applications. In some embodiments, the sensor component 714 may further include an acceleration sensor, a gyroscope sensor, a magnetic sensor, a pressure sensor or a temperature sensor.

The communication component 716 is configured to facilitate wired or radio communication between the terminal 700 and other devices. The terminal 700 may access a radio network based on communication standards, such as WiFi, 2G or 3G, or a combination of the WiFi, 2G or 3G. In an example, the communication component 716 receives broadcast signals or broadcast associated information from an external broadcast management system through a broadcast channel. In an example, the communication component 716 further includes a near field communication (NFC) module to facilitate short-range communication. For example, the NFC module may be implemented based on radio frequency identification (RFID) technology, infrared data association (IrDA) technology, ultra wide band (UWB) technology, Bluetooth (BT) technology, and other technologies.

In an example, the terminal 700 may be implemented by at least one application specific integrated circuit (ASIC), digital signal processor (DSP), digital signal processing device (DSPD), programmable logic device (PLD), field programmable gate array (FPGA), controller, microcontroller, microprocessor or other electronic components to perform the above method.

In an example, a non-transitory computer-readable storage medium including instructions is further provided, such as a memory 704 including instructions executable by the processor 720 of the terminal 700 to complete the above method. For example, the non-transitory computer-readable storage medium may be an ROM, a random access memory (RAM), a CD-ROM, a magnetic tape, a floppy disk, an optical data storage device, etc.

Figure 8:
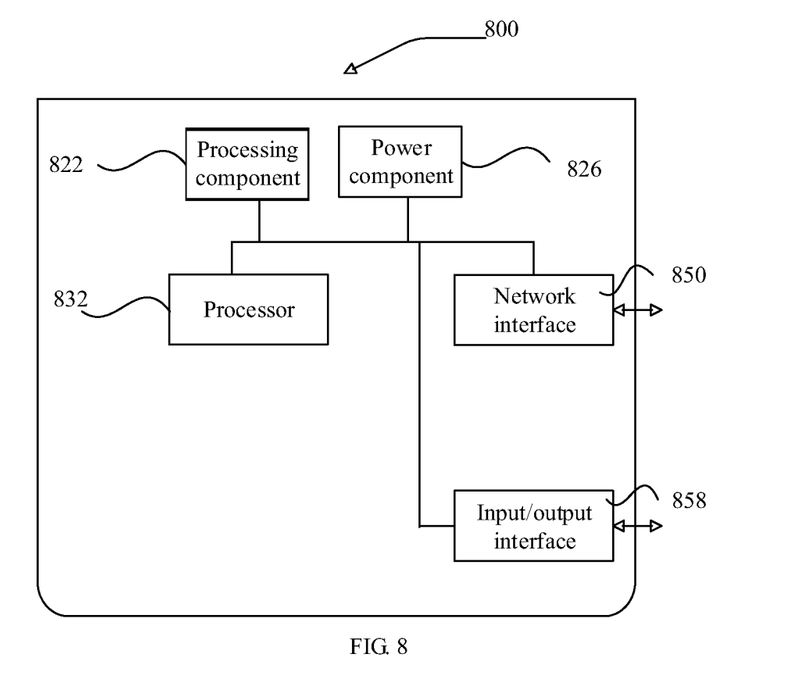
FIG. 8 is a schematic structural diagram of a communication device according to an example.

As shown in FIG. 8, an embodiment of the present disclosure shows a structure of a communication device 800. The communication device 800 may be a base station to which an embodiment of the present disclosure is related. For example, a communication device 800 may be provided as a network device. Referring to FIG. 8, the communication device 800 includes a processing component 822, and further includes at least one processor, and a memory resource represented by the memory 832, used to store instructions that may be executed by the processing component 822, such as applications. The applications stored in the memory 832 may include one or more modules each corresponding to a set of instructions. In addition, the processing component 822 is configured to execute instructions, to execute any methods performed by the communication device of the above methods.

The communication device 800 may further include a power component 826 configured to execute power supply management on the communication device 800, a wired or radio network interface 850 configured to connect the communication device 800 to a network, and an input/output (I/O) interface 858. The communication device 800 may operate an operating system stored in the memory 832 as the basis, such as Windows Server™, Mac OS X™, Unix™, Linux™, FreeBSD™ or the like.

Those skilled in the art would readily conceive of other implementations of the present disclosure after considering the specification and practicing the invention disclosed here. The present disclosure is intended to cover any variations, uses or adaptive changes of the present disclosure. These variations, uses or adaptive changes follow the general principle of the present disclosure and include common general knowledge or conventional technical means in the technical field that are not disclosed in the present disclosure. The description and the embodiments are merely regarded as exemplary, and the real scope and spirit of the disclosure are pointed out by the following claims.

It should be understood that the present disclosure is not limited to the precise structure described above and shown in the figures, and various modifications and changes can be made without departing from its scope. The scope of the present disclosure is only limited by the appended claims.

What is claimed is:

1. A method for determining a data processing duration, wherein the method is performed by a base station and comprises:

acquiring a time increment for performing preset data processing, which is determined according to physical downlink control channel (PDCCH) monitoring complexity, wherein the preset data processing is: demodulation of physical downlink shared channel (PDSCH) transmission or preparation for physical uplink shared channel (PUSCH) transmission, either of which is scheduled by downlink control information (DCI) monitored on the PDCCH;

wherein the PDCCH monitoring complexity comprises a maximum number of blind detection times of user equipment (UE) to perform blind detection of PDCCH monitoring events on a single slot.

2. The method for determining the data processing duration according to claim 1, wherein acquiring the time increment for performing the preset data processing, which is determined according to the PDCCH monitoring complexity comprises:

determining the time increment for performing the preset data processing according to the PDCCH monitoring complexity;

or receiving the time increment for performing the preset data processing, which is determined according to the PDCCH monitoring complexity and reported by the UE.

3. The method for determining the data processing duration according to claim 2, wherein the method further comprises:

receiving processing capability information of the UE;
determining the time increment for performing the preset data processing according to the PDCCH monitoring complexity comprises:
determining the time increment for performing the preset data processing according to the PDCCH monitoring complexity and processing capabilities, indicated by the processing capability information, of the UE.

4. The method for determining the data processing duration according to claim 2, wherein the PDCCH monitoring complexity is associated with a time unit that defines the PDCCH monitoring complexity;
determining the time increment for performing the preset data processing according to the PDCCH monitoring complexity comprises:
determining the time increment for performing the preset data processing according to the time unit that defines the PDCCH monitoring complexity.

5. The method for determining the data processing duration according to claim 4, wherein the method further comprises:
determining the time unit that defines the PDCCH monitoring complexity according to a subcarrier spacing (SCS) applied by the UE.

6. The method for determining the data processing duration according to claim 1, wherein the time increment is a duration increment for performing the preset data processing, which is relative to a time unit that defines the PDCCH monitoring complexity being one slot.

7. A communication device comprising:
a processor; and
a memory that is communicatively coupled to the processor,
wherein the processor is configured to cause the communication device to act as the base station and execute the method according to claim 1.

8. A non-transitory computer-readable storage medium, wherein the non-transitory computer-readable storage medium stores computer executable instructions, and when the computer executable instructions are executed by a processor of the base station, the computer executable instructions cause the base station to execute the method for determining a processing duration according to claim 1.

9. A method for determining a data processing duration, wherein the method is performed by a terminal and comprises:
determining a time increment for performing preset data processing according to physical downlink control channel (PDCCH) monitoring complexity, wherein the preset data processing is: demodulation of physical downlink shared channel (PDSCH) transmission or preparation for physical uplink shared channel (PUSCH) transmission, either of which is scheduled by downlink control information (DCI) monitored on the PDCCH;
wherein the PDCCH monitoring complexity comprises a maximum number of blind detection times of the terminal to perform blind detection of PDCCH monitoring events on a single slot.

10. The method for determining the data processing duration according to claim 9, wherein the method further comprises:
reporting processing capability information of the terminal to a base station.

11. The method for determining the data processing duration according to claim 9, wherein the PDCCH monitoring complexity is associated with a time unit that defines the PDCCH monitoring complexity;
determining the time increment for performing the preset data processing according to the PDCCH monitoring complexity comprises:
determining the time increment for performing the preset data processing according to the time unit that defines the PDCCH monitoring complexity.

12. The method for determining the data processing duration according to claim 11, wherein the method further comprises:
determining the time unit that defines the PDCCH monitoring complexity according to a subcarrier spacing (SCS) applied by the terminal.

13. The method for determining the data processing duration according to claim 9, wherein the time increment is a duration increment for performing the preset data processing, which is relative to a time unit that defines the PDCCH monitoring complexity being one slot.

14. The method for determining the data processing duration according to claim 9, wherein the method further comprises:
reporting the time increment to a base station.

15. A non-transitory computer-readable storage medium, wherein the non-transitory computer-readable storage medium stores computer executable instructions, and when the computer executable instructions are executed by a processor of the terminal, cause the terminal to execute the method for determining a processing duration according to claim 9.

16. A terminal comprising:
a processor; and
a memory that is communicatively coupled to the processor,
wherein the processor is configured to:
determine a time increment for performing preset data processing according to physical downlink control channel (PDCCH) monitoring complexity, wherein the preset data processing is: demodulation of physical downlink shared channel (PDSCH) transmission or preparation for physical uplink shared channel (PUSCH) transmission, either of which is scheduled by downlink control information (DCI) monitored on the PDCCH;
wherein the PDCCH monitoring complexity comprises a maximum number of blind detection times of the terminal to perform blind detection of PDCCH monitoring events on a single slot.

17. The terminal according to claim 16, wherein the processor is further configured to:
report processing capability information of the terminal to a base station.

18. The terminal according to claim 16, wherein the PDCCH monitoring complexity is associated with a time unit that defines the PDCCH monitoring complexity, and the processor is further configured to:
determine the time increment for performing the preset data processing according to the time unit that defines the PDCCH monitoring complexity.

19. The terminal according to claim 18, wherein the processor is further configured to:
determine the time unit that defines the PDCCH monitoring complexity according to a subcarrier spacing (SCS) applied by the terminal.

20. The terminal according to claim 16, wherein the time increment is a duration increment for performing the preset data processing, which is relative to a time unit that defines the PDCCH monitoring complexity being one slot.

* * * * *